Figure 1:
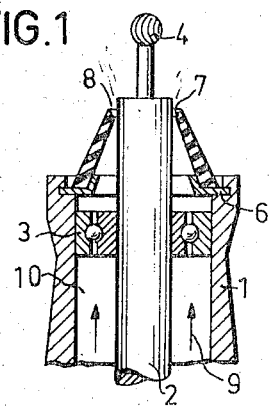

United States Patent

[11] 3,542,372

| [72] | Inventor | Svante Roland Edwardson |
| | | Solna, Sweden |
| [21] | Appl. No. | 842,798 |
| [22] | Filed | July 2, 1969 |
| | | Division of Ser. No. 607,183, |
| | | Jan. 4, 1967 |
| [45] | Patented | Nov. 24, 1970 |
| [73] | Assignee | AB Dentatus, |
| | | Hagersten, Sweden, |
| | | a corporation of Sweden |
| [32] | Priority | Jan. 14, 1966 |
| [33] | | Sweden |
| [31] | | No. 517/66 |

[54] PROCESS FOR SEALING ABOUT THE ROTARY SHAFT OF A TOOL
1 Claim, 4 Drawing Figs.

[52] U.S. Cl. .................................................. 277/1,
277/29; 308/36.2; 32/59
[51] Int. Cl. ..................................................... F16j 9/00,
E21b 33/00
[50] Field of Search........................................... 277/1, 29,
70, 212, 177, 75, 71, 173; 32/59, 28; 308/36.3,
36.2; 137/Inq; 51/Inq; 15/Inq; 134/Inq

[56] References Cited
UNITED STATES PATENTS

| 2,068,665 | 1/1937 | Douglass | 277/212F |
| 2,125,446 | 8/1938 | Hurtt | 308/36.3 |
| 2,336,913 | 12/1943 | Albrecht | 277/212F |
| 2,568,056 | 9/1951 | Corder | 277/168 |
| 3,139,159 | 6/1964 | Lob | 277/29UX |

Primary Examiner—Samuel S. Rothberg
Attorney—Young & Thompson

ABSTRACT: Solid particles are prevented from moving back along the rotary shaft of a tool, by surrounding the shaft of the tool with a generally conical sleeve of elastic deformable material which is secured to the casing of the tool shaft and which normally yieldably bears against the shaft with the sleeve converging toward the tool end of the shaft, and forcing a fluid along the shaft toward the tool end of the shaft and past the sleeve between the sleeve and the shaft.

Patented Nov. 24, 1970  3,542,372

INVENTOR.
SVANTE ROLAND EDWARDSON
BY
Young & Thompson
ATTYS.

PROCESS FOR SEALING ABOUT THE ROTARY SHAFT OF A TOOL

This application is a division of copending application Ser. No. 607,183 filed Jan. 4, 1967, now abandoned.

The present invention relates to methods for protecting the working parts of machines having a shaft or part rotatable therewith located in the inlet or outlet of the machine casing. Such machines often comprise easily damaged bearings in the inlet or outlet which bearings can be damaged by dust or other foreign matter, such as metallic chips arising during operation of a tool driven by the motor. Especially in case of tools which are driven by a pneumatic motor and directly connected to the shaft of the motor the risk of damages is great because such motors comprise easily damaged parts which as far as possible should be protected from foreign matter. It is the object of this invention to provide a device which renders possible an effective protection.

The invention is characterized by blowing a fluid past an elastic sealing element which when the machine is at rest effects a seal in the inlet or outlet between the shaft or the part rotatable therewith and the surrounding machine casing whereas upon start of the machine the sealing element is yielding to the working medium and deflected thereby so as to uncover the inlet or outlet. The sealing element may be in the form of a conical ring one end of which is secured to the machine casing and the other end of which abuts the shaft when the machine is at rest. Preferably the sealing end of the conical ring tapers off to its sealing surface so that it can easily expand under the action of the working medium flowing in through the inlet or out through the outlet.

Figure 2:
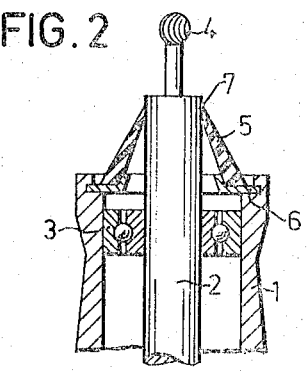
Figure 3:
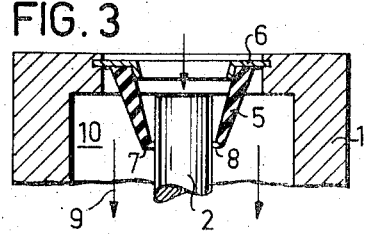
Figure 4:
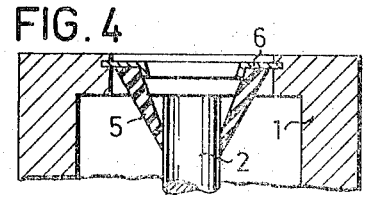

Longitudinal sectional views of different embodiments of the invention are illustrated in the annexed drawing. FIGS. 1 and 2 illustrate an outlet of a machine in operation and at rest, respectively, and FIGS. 3 and 4 illustrate an inlet of a machine in operation and at rest, respectively.

Referring to the drawing, numeral 1 denotes part of a machine casing, such as the casing of a pneumatic motor, and numeral 2 denotes the shaft of a machine, such as a motor, this shaft being mounted in the machine casing 1 by means of a bearing 3. The end of the shaft which projects out of the machine casing carries a tool 4. In the opening between the part 1 of the machine casing and the shaft 2 there is provided a sealing element which forms a protection against entering dust, chips and the like. In the embodiment illustrated, the sealing element is in the form of a conical ring 5 the base of which is secured to a metallic ring 6 which in turn is secured to the part 1 of the machine casing. The conical sealing element tapers from its base toward its sealing surface 7 at the smaller end of the ring and is yielding or resilient and of such a shape that the sealing surface 7 sealingly abuts the shaft 2 when the machine is not running (FIG. 2), but opens so as to form a discharge opening 8 between the shaft and the sealing surface when the machine is started and working medium is forced in the direction of the arrows 9 into the space 10 between the shaft and the part 1 of the machine casing. In the outlet shown in FIGS. 1 and 2, the sealing surface 7 of the sealing element is directed outwardly, and in an inlet of the machine the sealing surface is directed inwardly as shown in FIGS. 3 and 4 in which the same reference numerals are employed for corresponding parts shown in FIGS. 1 and 2.

Preferably the sealing element consists of an elastic material, such as silicone rubber, which also has the advantage that it can withstand high temperatures and will not be damaged by a high-temperature working medium. It is possible, however, to replace such a sealing element by spring-biased rigid elements which are pivoted such that when the machine is at rest their sealing edges are kept in contact with the shaft by the spring member.

In the embodiments illustrated in FIGS. 1 to 4, the sealing element is secured to the machine casing and, consequently, not rotatable.

In all embodiments described, the sealing element effectively prevents metallic chips and other foreign matter from entering the inlet or outlet for the working medium when the machine is not running. When the machine is in operation, the sealing element permits passage of the working medium without obstruction.

I claim:

1. A process for sealing between the rotary shaft of a tool and the stationary casing of a pneumatic motor that rotates the shaft, comprising supporting the shaft for rotation in bearing means, surrounding the shaft with a generally conical sleeve of elastic deformable material which is secured to the casing and which normally yieldably bears against the shaft between the bearing means and the tool end of the shaft with the sleeve converging toward the tool end of the shaft, and forcing air from the pneumatic motor along the shaft toward the tool end of the shaft and past the sleeve between the sleeve and the shaft thereby to prevent solid particles from moving along the shaft into the casing.